Figure 1:
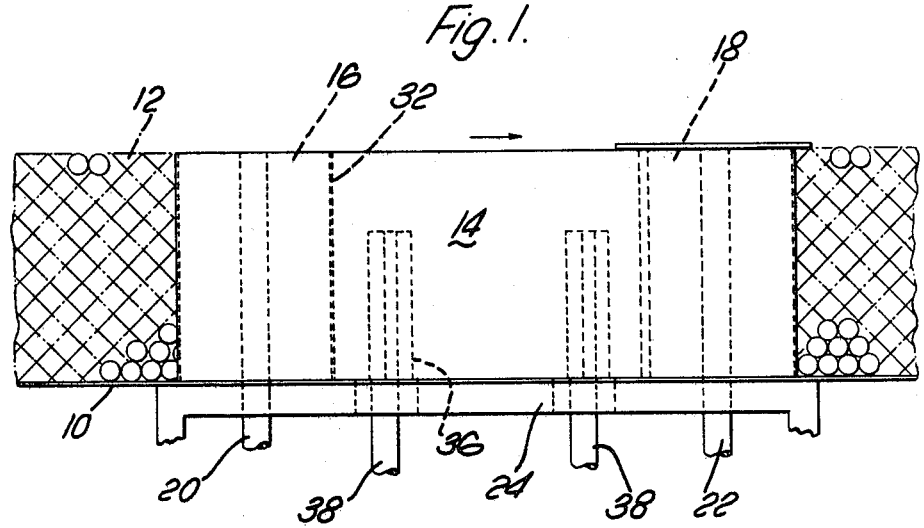

United States Patent [19]

Daisley

[11] 4,087,001

[45] May 2, 1978

[54] CONVEYORS FOR ROD-LIKE ARTICLES

[75] Inventor: Robert Thomas Daisley, London, England

[73] Assignee: Molins Limited, England

[21] Appl. No.: 712,805

[22] Filed: Aug. 9, 1976

[30] Foreign Application Priority Data

Aug. 16, 1975 United Kingdom ............... 34191/75

[51] Int. Cl.² ............................................ B65G 47/22
[52] U.S. Cl. .................................. 198/456; 198/597; 198/598
[58] Field of Search ................ 198/434, 456, 597–599, 198/626, 631, 636; 214/6 S; 271/240, 248, 221, 222; 131/25

[56] References Cited

U.S. PATENT DOCUMENTS

| | | | |
|---|---|---|---|
| 1,733,221 | 10/1929 | Fuller | 198/456 |
| 3,071,236 | 1/1963 | Hahn et al. | 198/456 |
| 3,252,593 | 5/1966 | Eynon | 198/456 |
| 3,667,751 | 6/1972 | Zernov et al. | 271/248 |
| 3,902,586 | 9/1975 | Hill | 198/456 |
| 3,923,299 | 12/1975 | Taylor et al. | 271/221 |

Primary Examiner—Bruce H. Stoner, Jr.
Assistant Examiner—Joseph E. Valenza
Attorney, Agent, or Firm—Craig & Antonelli

[57] ABSTRACT

The form of a moving stack of cigarettes or other rod-like articles is improved (so that it more closely resembles a compact honeycomb formation) by subjecting the stack to transverse (periodic) displacement in a direction parallel to the lengths of the cigarettes. In order to displace the cigarettes without drag the surfaces which cause the displacement are moved at about the same velocity as the stack. In one arrangement these surfaces comprise bands alongside the stack and are displaced by reciprocating plungers. In another arrangement the bands are displaced by rotary cam surfaces.

17 Claims, 3 Drawing Figures

CONVEYORS FOR ROD-LIKE ARTICLES

This invention is concerned with apparatus for conveying rod-like articles such as cigarettes.

In the cigarette manufacturing industry it is becoming increasingly common to transport articles such as cigarettes or filter plug lengths between various processing machines by way of conveyors which carry a continuous stream consisting of a stack of the articles moving transverse to their lengths. In many instances it is important that the stream should be well-formed, preferably with the articles at least approximately in a close-packed honeycomb formation. For example, in the apparatus disclosed in U.S.A. Patent Application No. 648,926 (German OS 2,602,564) successive batches formed from such a stream are placed on top of one another in a tray: there can be difficulties if the batches are of irregular and loose formation since the line of the top surface of each batch is uncertain.

The production of a stream consisting of a stack of rod-like articles moving transverse to their lengths is not normally carried out in such a way that the articles occupy a particularly compact formation. The form of such a stream may be improved, so that it approaches more closely a close-packed honeycomb formation, by imparting energy to the stream so that the articles may move relative to one another. The present invention relates to improving the form of a stream in this way.

Accordingly, the invention provides apparatus for conveying rod-like articles comprising a conveyor for moving a stream consisting of a stack of rod-like articles moving transverse to their lengths; and cooperating displacing means adjacent or associated with part of the conveyor including at least one surface on each side of the conveyor for displacing articles in the stream in a direction substantially parallel to the lengths of the articles by engagement of said surfaces with the ends of the articles, each of the surfaces being arranged to have a component of velocity in the direction of movement of the stream approximately equal to that of the stream, at least when said surface is in contact with the stream. The cooperating displacing means preferably has a reciprocal, rotary, or other periodic, harmonic or vibratory movement whereby the stream is laterally displaced over part of its length as it passes the displacing means but is returned to its original course subsequently. The distance through which the stream (or any article in the stream) is displaced may be quite small in relation to the lengths of the articles conveyed. When the transverse displacing means operates periodically the displacing means and its periodicity in relation to the speed of the conveyor may be such that any one article executes several cycles of transverse movement whilst passing the displacing means.

In a preferred arrangement the displacing means comprises a pair of opposed bands one on each side of the conveyor, and spaced at a distance slightly greater than the lengths of the articles on the conveyor. The bands are moved at the same speed as the conveyor and each is subjected in turn to lateral displacement towards the conveyor by a reciprocating plunger arranged directly behind the band. The plungers move in phase so that the distance between them remains constant and as they reciprocate the stream on the conveyor between the bands is periodically laterally displaced. The energy given to the articles by the displacement is sufficient to cause them to become more closely packed. Since the bands move longitudinally at the same speed as the conveyor there is little or no drag on the stream which could upset the surface level of the stream. Articles in the stream can be moved by the displacing means in such a way that there is relative axial movement of articles in a vertical (or any other) plane rather than in a substantially horizontal plane. For example, instead of plungers, opposed offset cam members each having an inclined annular cam surface rotating about an axis parallel to the rod-like articles could operate to displace the bands at different levels.

Figure 2:
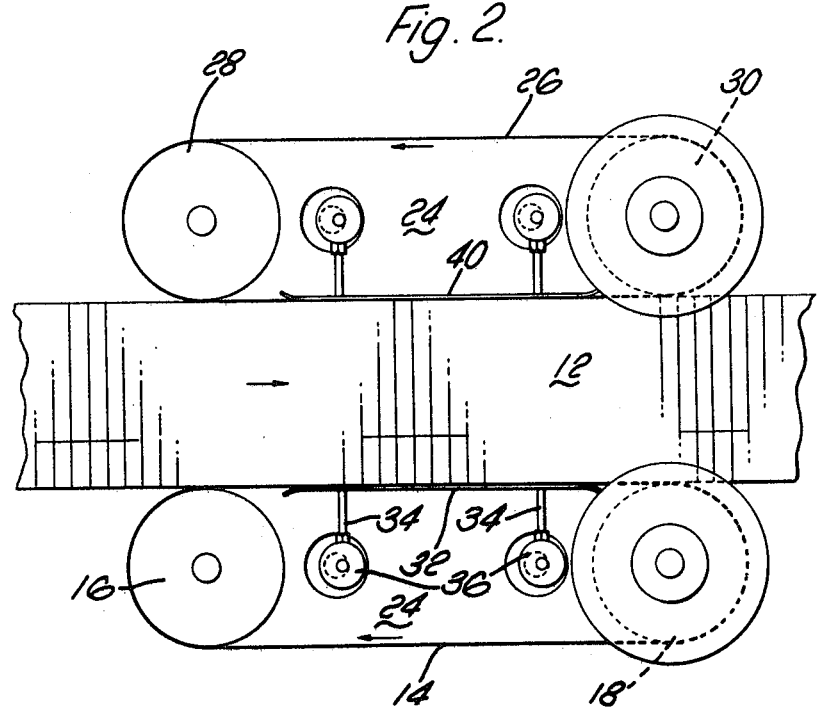
Figure 3:
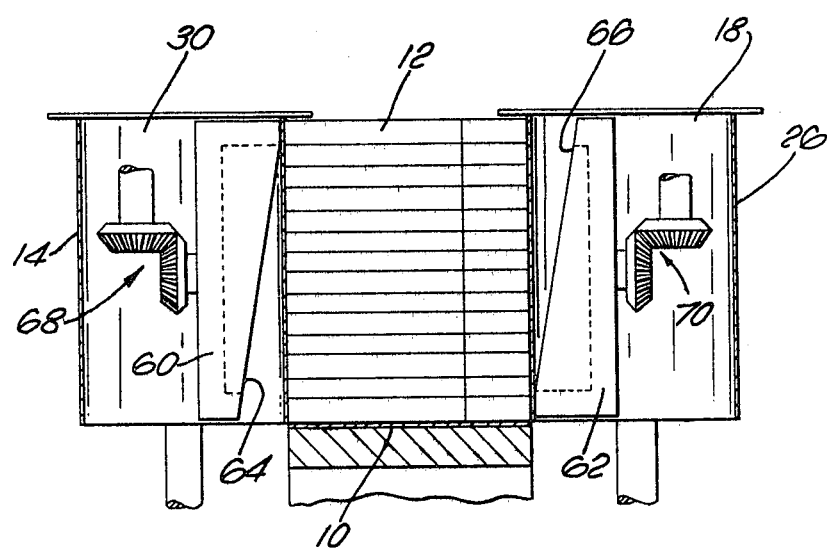

The invention will be further described, by way of example only, with reference to the accompanying drawings in which:

FIG. 1 is a side view of apparatus for conveying a stream of cigarettes, including displacing means, FIG. 2 is a plan view of the apparatus of FIG. 1, and FIG. 3 is a transverse sectional view through an apparatus similar to that of FIG. 1, having modified displacing means.

A conveyor 10 supports a stream 12 consisting of a continuous stack of cigarettes, arranged with their lengths transverse to that of the conveyor, and moves in the direction indicated in the drawings. An endless band 14 having one run parallel to and adjacent part of the stream 12 passes around pulleys 16, 18 carried by spindles 20, 22 rotatably supported by a frame 24. A similar endless band 26 passing around pulleys 28, 30 is arranged directly opposite the band 14. The height of the bands 14 and 26 is about the same as that of the stream 12.

A plunger 32 having a flat surface is arranged parallel and close to the run of the band 14 adjacent the stream 12. The plunger 32 is attached by links 34 to sleeves 36 which are eccentrically mounted on drive spindles 38. A similar plunger 40 is associated with the band 26.

The bands 14 and 26 are driven (by one or both of their respective rollers) in the direction indicated by the arrows so that the speeds of the bands are the same as that of the conveyor 10. The drive spindles 38 and the spindles for the plunger 40 are rotated in the same direction at the same speed and in phase so that the distance between the plungers 32 and 40 remains constant. This distance may be conveniently set so that the distance between the opposed surfaces of the bands 14 and 26 is about 1½ mm greater than the length of the cigarettes, in the stream 12. In view of the rotary mounting of the plungers 32 and 40 there will be a component of motion of the plungers parallel to the conveyor 10; if this component is ignored the plungers execute a reciprocal motion in unison so that each periodically displaces its respective band and with it moves axially the cigarettes in the vicinity of the band. The total axial movement each side of the mean position on the conveyor is quite small, of the order of 2½% of the length of the cigarettes. The energy imparted is however sufficient to cause relative movement between the cigarettes to allow them to settle into a compact formation.

It has been noted that the motion of the plunger 32 and 40 includes a component parallel to the conveyor 10: this is unnecessary and the motion could be linear transverse to the conveyor. In the arrangement shown in the drawings one of the plungers has a component velocity in a direction opposite to the motion of the conveyor: if the plungers are to have any component velocity along the conveyor it may be preferable to arrange for this velocity to be in the same direction as the conveyor to reduce drag on the band. In any case the contacting surfaces of the bands and the plungers may be of low friction materials.

In the apparatus shown in FIG. 3 parts similar to those shown in FIGS. 1 and 2 have been given similar reference numerals. The displacing means comprises a pair of opposed circular members 60, 62 having inclined annular cam surfaces 64, 66 respectively. The members 60, 62 are rotatable behind the bands 14, 26, in the same direction around a common axis and at the same speed, by means of drive gears indicated at 68 and 70. The cam surfaces 64, 66 are inclined by a similar amount to the common axis and are mounted in rotational positions such that their surfaces remain parallel, i.e. the angular positions of the members relative to the axis are separated by 180°. The high parts only of the cam surfaces 64, 66 contact the bands 14 and 26 respectively and displace them by about the same amount as the plungers 32 and 40. As the members 60 and 62 are rotated there is therefore an offset opposed displacement of the bands around a circular path. The consequent displacement of the cigarettes is sufficient to cause improvement in the form of the stack.

One possible use for the present apparatus is with the tray filling apparatus disclosed in U.S.A. Patent Application No. 648,926 (German OS No. 2,602,564). In this tray filling apparatus a continuous stream of cigarettes or other rod-like articles is divided into batches which are subsequently plunged, in an axial direction relative to the articles, into trays so that several batches are stacked on top of one another in a tray. The present apparatus could be used for improving the form of the batches prior to plunging. The bands 14 and 26 could be adjacent to the conveyor 26, shown in FIG. 1 of Application No. 648,926 in the vicinity of the tamping members 42. It is possible that the tamping members 42 would not be needed if the present apparatus were associated with the conveyor 26. Similarly the present apparatus could augment or replace the action of top band 142 shown in FIG. 4 of Application No. 648,926 The entire disclosure of said application is hereby incorporated in the present application.

The present apparatus could also be used in conjunction with the conveyors for streams of rod-like articles in the apparatus of British Patent Specification No. 1,404,141.

The present apparatus is not confined to the use of bands. Other conveyors such as rollers could be used as or as part of the displacing means. In one possible arrangement four opposed pairs of rollers are arranged along the conveyor. The first and last pairs of rollers would be aligning rollers for the stream on the conveyor whilst the middle pairs would act as the displacing means. Although these rollers could be stationary (but rotational) and simply offset to displace the stream laterally first one way and then the other, they are preferably laterally oscillated so that the gap between them is moved parallel to the lengths of the cigarettes in the stream. Preferably the pairs of rollers would be oscillated 180° out of phase. The mechanism for causing the oscillation could move the axes of rotation of the rollers or, alternatively, the rollers could be appropriately eccentrically mounted, with their axes of rotation offset from their central axes. Where the rollers are not oscillated by simply displace the stream it is conceivable that pairs of rollers would not be required, a single roller being positioned on the side of the conveyor from which it is desired to deflect or align the stream. In this embodiment bands slightly inclined to the direction of movement of the conveyor might be used instead of rollers. Again, bands passing around oscillating rollers could be used.

I claim:

1. Apparatus for conveying rod-like articles comprising a conveyor for moving a stream consisting of a stack of rod-like articles in a direction transverse to the lengths of said articles along a predetermined path; cooperating displacing means adjacent part of the conveyor, including at least one surface of each side of the conveyor for displacing the stream of articles in a direction substantially parallel to the lengths of the articles from said predetermined path to an adjacent path and back to said predetermined path by engagement of said surfaces with the ends of the articles; and drive means synchronized with said conveyor for moving each of the surfaces with a component of velocity in the direction of movement of the stream approximately equal to that of the stream, at least when said surface is in contact with the stream.

2. Apparatus as claimed in claim 1, wherein the cooperating displacing means comprises opposed surfaces, and wherein said drive means includes means for imparting to said surface a periodic motion having a component in the direction of the lengths of the rod-like articles of the stream.

3. Apparatus as claimed in claim 2 wherein the periodic motion is phased so that the distance between said opposed surfaces remains substantially constant.

4. Apparatus as claimed in claim 2 wherein the cooperating displacing means is arranged so that each rod-like article is displaced several times as it passes the displacing means.

5. Apparatus as claimed in claim 1 wherein the displacing means comprises at least one endless band on each side of the conveyor, said bands having opposed runs which are arranged substantially at right angles to the lengths of the articles in said stream and which are spaced by a distance slightly greater than the lengths of said articles.

6. Apparatus for conveying rod-like articles comprising a conveyor for moving a stream consisting of a stack of rod-like articles in a direction transverse to the lengths of said articles; and cooperating displacing means adjacent part of the conveyor, including at least one endless band on each side of the conveyor, said bands having opposed runs which are arranged at substantially right angles to the lengths of the articles in said stream and which are spaced by a distance slightly greater than the lengths of said articles for displacing articles of the stream in a direction substantially parallel to the lengths of the articles by engagement with the ends of the articles, each of the surfaces being arranged to have a component of velocity in the direction of movement of the stream approximately equal to that of the stream, at least when said surface is in contact with the stream wherein the displacing means further comprises a reciprocal plunger arranged behind each of said runs.

7. Apparatus for conveying rod-like articles comprising a conveyor for moving a stream consisting of a stack of rod-like articles in a direction transverse to the lengths of said articles along a predetermined path; cooperating displacing means adjacent part of the conveyor, including at least one endless band on each said of the conveyor, said bands having opposed runs which are arranged at substantially right angles to the lengths of the articles in said stream and which are spaced by a distance slightly greater than the lengths of said articles for displacing the articles of the stream in a direction substantially parallel to the lengths of the articles between said predetermined path and an adjacent path by engagement of said surfaces with the ends of the articles, and the cooperating displacing means also including means for operating on different levels of the stream at different times so as to effect relative axial movement of the rod-like articles in a vertical plane; and drive means synchronized with said conveyor for moving each of the surfaces with a component of velocity in the direction of movement of the stream approximately equal to that of the stream, at least when said surface is in contact with the stream.

8. Apparatus as claimed in claim 7 wherein the displacing means includes endless bands arranged on opposite sides of the conveyor and rotary cam members arranged to operate on said bands, each cam member having an inclined annular cam surface.

9. Apparatus for conveying rod-like articles comprising a conveyor for moving a stream consisting of a stack of rod-like articles in a direction transverse to the lengths of said articles along a predetermined path; cooperating displacing means adjacent part of the conveyor, including at least one surface on each side of the conveyor for displacing the articles of the stream in a direction substantially parallel to the lengths of the articles between said predetermined path and an adjacent path by engagement of said surfaces with the ends of the articles; and drive means synchronized with said conveyor for moving each of the surfaces with a component of velocity in the direction of movement of the stream approximately equal to that of the stream, at least when said surface is in contact with the stream; said cooperating diplacing means including at least one pair of spaced opposed rollers which are rotatable about axes which lie at right angles to the lengths of said rod-like articles and their direction of movement in the stream, and which may be laterally oscillated so that the gap between the opposed surfaces of said rollers is moved parallel to the lengths of said articles.

10. Apparatus as claimed in claim 9 including a further pair of rollers and a pair of bands, one passing around the two rollers on each side of said stream.

11. Apparatus for conveying a moving stack of rod-like articles comprising conveyor means for moving a stream consisting of a stack of rod-like articles along a predetermined path in a direction transverse to the lengths of said articles; and cooperating displacing means disposed on opposite sides of said conveyor for reciprocally laterally displacing said stream in a direction substantially parallel to the lengths of the articles over part of its length from said predetermined path to a displaced path and back to said predetermined path, including at least one surface positioned on each side of said conveyor means for contact with the ends of the articles in said stream and drive means for moving each of said surfaces with a coordinate movement toward and away from said stream to transversely move the stream in a reciprocal manner in a transverse direction.

12. Apparatus as defined in claim 11 wherein the cooperating displacing means is arranged so that each rod-like article is displaced several times as it passes the displacing means.

13. Apparatus as claimed in claim 11 wherein the displacing means comprises at least one endless band on each side of the conveyor, said bands having opposed runs which are arranged substantially at right angles to the lengths of the articles in said stream and which are spaced by a distance slightly greater than the lengths of said articles.

14. Apparatus as claimed in claim 13 wherein the displacing means further comprises a reciprocal plunger arranged behind each of said runs.

15. Apparatus as claimed in claim 13 wherein the cooperating displacing means includes means for operating on different levels of the stream at different times so that the displacing means causes relative axial movement of the rod-like articles in a vertical plane.

16. Apparatus as claimed in claim 15 wherein the displacing means includes endless bands arranged on opposite sides of the conveyor and rotary cam members arranged to operate on said bands, each cam member having an inclined annular cam surface.

17. Apparatus as claimed in claim 11 wherein the cooperating displacing means includes at least one pair of spaced opposed rollers which are rotatable about axes which lie at right angles to the length of said rod-like articles and their direction of movement in the stream, and which may be laterally oscillated so that the gap between the opposed surfaces of said rollers is moved parallel to the lengths of said articles.

* * * * *